Oct. 30, 1962  D. E. GENSHEIMER ETAL  3,061,654
ISOBUTYLENE PURIFICATION PROCESS USING A
PRE--TREATED ZEOLITIC MOLECULAR SIEVE
Filed Oct. 28, 1959
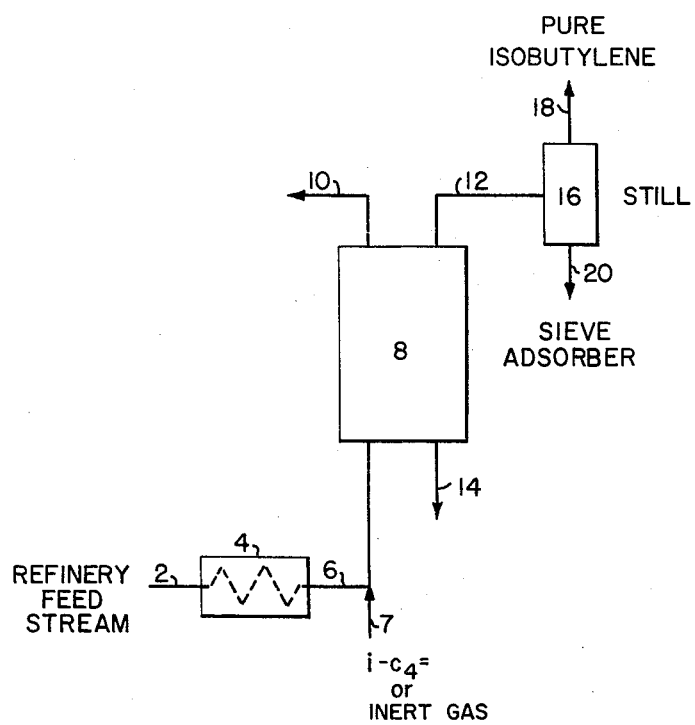
David Edward Gensheimer
Elmo Clyde Brown   Inventors
By Richard H. Nagel
Attorney 3,061,654
ISOBUTYLENE PURIFICATION PROCESS USING A PRE-TREATED ZEOLITIC MOLECULAR SIEVE
David Edward Gensheimer and Elmo Clyde Brown, Baton Rouge, La., assignors to Esso Research and Engineering Company, a corporation of Delaware
Filed Oct. 28, 1959, Ser. No. 849,235
8 Claims. (Cl. 260—677)

The present invention relates to a process for the purification of isobutylene streams. More particularly, the present invention relates to the preparation of isobutylene streams of greater than 99.9% purity adapted to be used in the manufacture of synthetic high molecular weight polymeric resins such as butyl rubber, isobutylene-styrene rubbers, isobutylene-butadiene rubbers and the like.

In the preparation of polymers of the butyl rubber and related types, it is essential to maintain a high state of purity of the isobutylene monomer. More than a trace of normal butenes act as poisons for the polymerization of isobutylene. The molecular weight of the polymer is thereby limited, and lower molecular weight polymer results. Ideally, the amount of normal butenes in the feed should be zero.

The most common commercial method of purifying isobutylene streams is to adsorb the dilute stream of isobutylene in sulfuric acid; the isobutylene is preferentially adsorbed from the other hydrocarbons. This is followed by desorption, caustic washing and water washing. The final step is a superfractionation to raise the isobutylene concentration from about 97% to about 99.3% by (a) removal of water; (b) removal of $C_{5+}$; and (c) removal of butene-2.

Besides the large number of steps involved in the purification, this method does not remove the small amount of butene-1. Butene-1 and isobutylene boil too closely together to be separated, even by superfractionation.

Recently, a highly effective hydrocarbon separation tool has become available in the form of molecular sieves, which are natural or synthetic crystalline adsorbents of the zeolite family having the property of selectively adsorbing molecules in accordance with their molecular cross section. These sieves have pore openings of uniform size and will adsorb molecules having cross sectional areas equal or smaller than this size, but exclude larger diameter materials. Among the natural crystalline aluminosilicates having this molecular sieve property are chabazite and analcite. An excellent zeolite having a pore diameter of about 4 Angstrom units is described in a patent to Milton et al., U.S. 2,882,243, and is prepared by heating sodium silicate and sodium aluminate until the initially formed sodium alumino-silicate gel is crystallized to form a product corresponding to $Na_2O \cdot Al_2O_3 \cdot 2SiO_2 \cdot nH_2O$. This material, on activation, has a pore diameter of 4 Angstrom units, too small to admit any but very low molecular weight hydrocarbons. On base exchange with an alkaline earth metal salt, such as a calcium chloride solution, the pores are widened to 5 Angstroms. The zeolite is thereafter pelleted with a binder, such as kaolin or other clay, and then activated by calcination in air at a temperature of about 700° to 1000° F. This zeolitic material is highly selective for adsorbing straight chain paraffins and olefins, and excludes branch chained hydrocarbons. Thus it would appear to be a highly effective selective adsorption agent for removing small amounts of normal olefins from the isobutylene streams here under consideration.

However, desirous as it is to employ these molecular sieves in treating isobutylene streams, their use has caused certain problems. It has been found that when sieves are contacted with isobutylene streams, substantial polymerization occurs to diisobutylene and higher polymers. The extent of this polymerization may be as high as 15 to 25% of the feed. It not only represents a loss of valuable product but furthermore requires facilities for its removal; the presence of isobutylene polymer is highly undesirable in feeds to the butyl rubber process.

It is, therefore, an important object of the present invention to set forth a process for preparing isobutylene streams of high degree of purity.

It is a still further object of the present invention to prepare a feed for synthetic rubber by a process which does not polymerize feed components.

Other and further objects and advantages of the present invention will become more apparent hereinafter.

In accordance with the present invention, the sieve is subjected to a pretreatment step whereby the polymerization activity of the sieve, which may be due in part to the zeolite, in part to the binder, or possibly even to a factor yet unknown, is substantially diminished without adversely affecting the adsorption characteristics of the sieve. Thus oxygen adsorbed on the surface of the sieve or binder may be at least in part responsible for the catalytic activity thereof.

Ine one embodiment of the present invention, the fresh sieve is pretreated with an inert gas at elevated temperatures in a non-oxidizing atmosphere. Thereafter, the sieve is employed in the separation of normal olefins from isobutylene with substantially diminished polymer formation. In another embodiment of the present invention the sieve is contacted at elevated temperatures with isobutylene or an isobutylene polymer, such as diisobutylene, thereafter treated with an inert gas, also at elevated temperatures, and thereafter the sieve is employed in the separation of normal from isobutylene with much diminished polymerization activity.

The process of the present invention may be more clearly understood when reference is had to the accompanying drawing, showing preferred modifications of the invention.

Turning now to the drawing, first to be considered is the modification wherein a sieve is pretreated with isobutylene or diisobutylene. A stream of isobutylene or dimer is passed through lines 7 and 6 into vessel 8, which is packed with the fresh sieve pellets to be employed in the subsequent adsorption process. The hydrocarbon may be heated if desired, or heat may be supplied to the bed within chamber 8, in addition to any heat generated resulting from a polymerization reaction. Sufficient hydrocarbon is added preferably to flood the bed, and a temperature within the range of from about 200° to 500° F. It is preferred to maintain contact of the hydrocarbon with the sieve for a period of about 0.5 to 2 hours. As a result of this treatment, a certain amount of polymerization and carbon deposition takes place. However, inasmuch as the fluid is of a molecular size having a larger cross section than the sieve pores, this polymerization and carbon make do not take place within the pores of the adsorbent, but is restricted to the exterior surface of the crystalline adsorbent.

When no more reaction takes place, excess hydrocarbon is withdrawn through line 14, and an inert oxygen-free stripping gas, such as natural gas or nitrogen, is passed into reactor 8, to remove hydrocarbonaceous material. This stripping is preferably carried out at a temperature of about 400° to 800° F. Stripping gas may be removed through line 10. Thereafter, after cooling, the sieve is ready for use as a normal olefin adsorbent.

Instead of isobutylene or dimer, a stream of nitrogen or natural gas or other low molecular weight hydrocarbon such as methane or ethane may be passed through line 7 into chamber 8. The sieve bed may be heated at a temperature of from about 400° to 800° F. for a period of 2 to 8 hours, to displace any oxygen adsorbed on the surface of the bed. The gas is withdrawn through line 10 and may be recycled.

After either pretreating technique, the bed is now ready for the selective adsorption of normal olefins from the isobutylene. A refinery stream from which butadiene has been extracted in a known manner may be further contacted with 65% $H_2SO_4$ which preferentially adsorbs isobutylene. The feed to the sulfuric acid contains about 30% isobutylene.

After desorption the stream generally has the following composition:

| | Percent |
|---|---|
| $i-C_4H_8$ | 95 |
| Butene-1 and 2 | 0.4–1.2 |
| n-Butane | 0.5–1.6 |
| $C_{5+}$ | 0.8–2.3 |

This product is passed via line 2 and cooler 4, wherein it is cooled to about 40° to 130° F., and line 6 to zeolite treating vessel 8. It is contacted at a rate of about 0.5 to 10 w./hr./w. and preferably at atmospheric pressure with the 5 Angstrom type crystalline metallo alumino-silicate described hitherto. The zeolite may be arranged on trays or packed on supports or be unsupported. It may be tableted or pelleted but an active clay binder is preferably not employed. The zeolite removes substantially all the water and the straight chain hydrocarbons, including butene-1. Temperatures within 8 are maintained in the range of about 60° to 130° F.

The substantially completely butylene-free isobutylene is withdrawn through line 12 and passed to a simple distillation zone 16. This may be a simple fractionating tower of ten plates and serves to remove traces of polymer and branched chain $C_{5+}$ hydrocarbons. The resulting overhead product contains isobutylene of purity 99.9+%. The trace of polymer and branched chain $C_{5+}$ hydrocarbons is withdrawn through line 20.

From time to time it may be desirable to desorb the zeolite from accumulated butenes and $H_2O$. This may be done in any one of a number of conventional means, such as heat, vacuum, use of inert stripping gas and the like. During such desorption, the isobutylene concentrate may be passed through a similar adsorber in parallel.

The process of the present invention may be modified in many respects. Thus, though the pretreatment step has been described in relation to isobutylene streams and 5 Angstrom sieves, it may be employed in any process involving olefin feeds, particularly where only trace amounts of olefins are present. This will lower substantially the fouling rate in these processes by virtue of their being fewer long chain polymers present to adsorb. Long chain polymers are difficult to desorb and contribute to sieve fouling. Likewise, other molecular sieves having 4, 10 and 13 Angstrom unit pore openings may be pretreated to inactivate their catalytic properties without affecting their adsorption capacities.

The advantages obtained by operating in accordance with the present invention will be further illustrated by the following examples.

*Example 1*

A bed of fresh 5 Angstrom synthetic molecular sieve pellets, consisting of a sodium-calcium alumino-silicate and a clay binder, was treated with isobutylene at 260° F. for 1 to 2 hours. Temperature during the treat went up to 310° F., and the bed was flooded with isobutylene/isobutylene polymers. The bed was then drained, flushed with nitrogen at 750° F., and then employed in the cyclical removal of n-olefins from isobutylene as described. By cyclical removal reference is had to the process of adsorbing n-olefins until no more are adsorbed, and thereafter desorbing the sieve by stripping with an inert gas, such as $N_2$ or natural gas, at temperatures of 400° to 800° F. The adsorption cycle is carried out at a temperature of 60° to 130° F. at a preferred throughput rate of 2 w./hr./w. For comparison, data also show results obtained with fresh sieves.

| | W./Hr./W. | Maximum Bed Temperature, °F. | Percent Product Dimer |
|---|---|---|---|
| Fresh sieve, 1st cycle | 1.9 | 193 | 9.6 |
| Fresh sieve, 2nd cycle | 1.9 | 140 | 2.9 |
| Treated sieve, 1st cycle | 2.2 | 106 | 3.0 |
| Treated sieve, 2nd cycle | 2.2 | 89 | 1.1 |

*Example 2*

This example compares the results obtained when fresh sieves are (1) calcined in the presence of air, a standard dehydration technique, (2) no pretreatment, and (3) heated with an inert gas.

| Sieve Pretreatment | Percent Dimer in Product | |
|---|---|---|
| | 6 W./Hr./W. | 2 W./Hr./W. |
| Air @ 750° F | 7.5 | 20+ |
| None | 4.7 | |
| Nitrogen @ 750° F | 1.1 | 2.4 |

The pretreated sieves were contacted with the isobutylene stream at 120° F. and at the throughput rates shown. The greater polymer yield for the lower throughput rates follows from the longer contact time of the reagents.

*Example 3*

The following example shows that the adsorption capacity of the sieve is unaffected by the pretreatment.

Sieve pretreatment:  Capacity, wt. percent $C_4H_8$-1 on sieve

Calcined in air, 750° F _____ 5.2

Used sieve, regenerated and calcined in $N_2$ @ 750° F _____ 5.4

Prefouled and stripped with $N_2$ _____ [1] 8.0

[1] At 1.02 wt. percent butene-1 in feed. Sieve capacity increases with increasing feed impurities; a capacity of 8% at the higher level corresponds to a capacity of 5.2 to 5.4% at 0.4% butene-1 in feed (Examples 1 and 2).

*Example 4*

The following example describes the recovery of a high purity isobutylene stream from a feed containing normal butylenes.

Fresh sieve at 260° to 500° F. is contacted with isobutylene at 0.1 to 1 w./hr./w. feed rate until the bulk of the sieve is coated with polymer. Contact is maintained under these conditions for 0.5 to 2 hours. (Alternatively, sieve at 200° to 500° F. is contacted with isobutylene or diisobutylene for the same period under static conditions.) The polymeric materials resulting from either of the above methods are then stripped from the sieve with nitrogen, natural gas or other inert gas at 400° to 800° F. for 2 to 8 hours. After cooling to 60° to 130° F. (and perhaps evacuating to remove some of the residual natural gas hydrocarbons), isobutylene containing 0.4 wt. percent n-butylenes (range 0.25 to 1.5%) is fed to the sieve at 0.5 to 6 w./hr./w. Cumulative product (about 13 w./w.) contains less than 0.05 wt. percent n-butylenes. (At 1% impurity level, 8 w./w. contain less than 0.05 wt. percent.) The sieve is stripped with natural gas at 400° to 700° F. for 2 to 4 hours, cooled and evacuated and the next adsorption cycle begun.

It is not necessary to maintain a flow of isobutylene or diisobutylene into the reactor. The reactor need only be filled with the olefins, blocked off and allowed to "stew" for about ½ to about 2 hours.

What is claimed is:

1. In a process wherein normal olefins are separated from isoolefins in a crystalline alumino-silicate molecular sieve adsorption zone, the improvement which comprises initially treating said sieves with a fluid selected from the class of isoolefins and inert gases at elevated temperatures of from about 200° to about 800° F. to decrease the polymerizing activity of said sieve without decreasing the adsorption capacity thereof, and thereafter passing a stream comprising said olefin mixture into said zone at a lower temperature than said above-named deactivation temperature.

2. An improved process for preparing isobutylene streams of a high degree of purity which comprises initially passing a hydrocarbon selected from the class consisting of isobutylene and isobutylene polymer into a fresh zeolitic molecular sieve adsorption zone having polymerizing activity, maintaining said liquid in said zone at a temperature of from about 200° to about 500° F., withdrawing liquid from said zone, stripping said sieve with an inert gas at a temperature of about 400° to about 800° F., cooling said bed, thereafter passing in an isobutylene stream contaminated with small amounts of normal butylenes, and adsorbing said normal butylenes at a temperature in the range of from about 60° to 130° F. from said stream.

3. The process of claim 2 wherein said bed is maintained at said elevated temperatures during the pretreating step for a period of 0.5 to 2 hours.

4. The process of claim 2 wherein said inert gas is natural gas.

5. In a process wherein normal olefins are separated from isoolefins in a crystalline alumino-silicate molecular sieve adsorption zone, the improvement which comprises initially treating said sieves with an inert gas at temperatures in the range of about 400° to 800° F. to decrease the polymerizing activity of said sieve without decreasing the adsorption capacity thereof, and thereafter passing a stream comprising said olefin mixture into said zone.

6. The process of claim 5 wherein said gas is natural gas.

7. The process of claim 5 wherein said gas is nitrogen.

8. The process of claim 5 wherein said gas is passed at said elevated temperatures through said zone for 2 to 8 hours.

References Cited in the file of this patent

UNITED STATES PATENTS

| | | |
|---|---|---|
| 2,818,137 | Richmond et al. | Dec. 31, 1957 |
| 2,885,368 | Hess et al. | May 5, 1959 |
| 2,894,998 | Hess et al. | July 14, 1959 |
| 2,906,795 | Ballard et al. | Sept. 29, 1959 |
| 2,971,993 | Kimberlin et al. | Feb. 14, 1961 |